(12) United States Patent
Allen et al.

(10) Patent No.: US 11,113,469 B2
(45) Date of Patent: Sep. 7, 2021

(54) NATURAL LANGUAGE PROCESSING MATRICES

(71) Applicant: International Business Machines Corporation, Armonk, NY (US)

(72) Inventors: Corville O. Allen, Morrisville, NC (US); Roberto Delima, Apex, NC (US); Chris Mwarabu, Holly Springs, NC (US); David Contreras, Willow Spring, NC (US); Kandhan Sekar, Durham, NC (US); Krishna Mahajan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/366,628

(22) Filed: Mar. 27, 2019

(65) Prior Publication Data
US 2020/0311197 A1 Oct. 1, 2020

(51) Int. Cl.
| | | |
|---|---|---|
| *G10L 15/00* | (2013.01) | |
| *G10L 15/18* | (2013.01) | |
| *G06F 40/284* | (2020.01) | |
| *G06F 17/16* | (2006.01) | |
| *G06F 40/289* | (2020.01) | |

(52) U.S. Cl.
CPC ............ *G06F 40/284* (2020.01); *G06F 17/16* (2013.01); *G06F 40/289* (2020.01)

(58) Field of Classification Search
None
See application file for complete search history.

(56) References Cited

U.S. PATENT DOCUMENTS

| | | |
|---|---|---|
| 5,873,056 A | 2/1999 | Liddy |
| 6,236,959 B1 | 5/2001 | Weise |
| 6,714,939 B2 | 3/2004 | Saldanha |
| 7,624,007 B2 | 11/2009 | Bennett |
| 7,752,538 B2 * | 7/2010 | Vion-Dury ......... G06K 9/00449 715/228 |
| 8,594,996 B2 * | 11/2013 | Liang ...................... G06F 40/10 704/9 |
| 9,087,043 B2 * | 7/2015 | Kandekar ........... G06F 3/04842 |
| 9,613,004 B2 * | 4/2017 | Liang ...................... G06F 40/10 |
| 10,019,437 B2 * | 7/2018 | Ho .......................... G06F 40/30 |
| 10,055,476 B2 * | 8/2018 | Ahmad ................. G06F 16/285 |
| 2005/0005266 A1 | 1/2005 | Datig |
| 2006/0149549 A1 | 7/2006 | Napper |
| 2008/0104071 A1 | 5/2008 | Pragada |
| 2009/0012842 A1 * | 1/2009 | Srinivasan .............. G06F 40/30 705/12 |
| 2016/0247061 A1 * | 8/2016 | Trask ....................... G06N 3/04 |
| 2017/0262412 A1 * | 9/2017 | Liang ...................... G06F 40/10 |
| 2018/0075011 A1 | 3/2018 | Allen |
| 2018/0082197 A1 * | 3/2018 | Aravamudan ........... G06N 5/04 |

(Continued)

*Primary Examiner* — Satwant K Singh
(74) *Attorney, Agent, or Firm* — Brian D. Welle

(57) ABSTRACT

A phrase may be received that includes a plurality of tokens in a natural language format. A plurality of levels relating to dependencies between tokens of the plurality of tokens within the phrase is determined. A matrix structure is generated for the phrase. The matrix structure utilizes a plurality of rows and a plurality of columns to store data of the phrase. The plurality of rows and the plurality of columns each indicate one of an order of tokens of the plurality of tokens or levels of the plurality of levels.

25 Claims, 4 Drawing Sheets

(56) References Cited

U.S. PATENT DOCUMENTS

| | | |
|---|---|---|
| 2018/0101598 A1 | 4/2018 | Allen |
| 2018/0336183 A1* | 11/2018 | Lee .......................... G06F 40/30 |
| 2019/0034540 A1* | 1/2019 | Perkins ............... G06F 16/2228 |
| 2019/0354883 A1* | 11/2019 | Aravamudan ........... G06N 5/04 |

* cited by examiner

NATURAL LANGUAGE PROCESSING MATRICES

BACKGROUND

The present disclosure relates to natural language processing, and more specifically, to analysis of a relatively large corpus of natural language data by a computing system. For example, the computing system may include a decision-support system to assist humans in retrieving and analyzing massive stores of data. One such example of a decision-support system is a diagnosis system employed in the healthcare industry. Diagnosis systems may be configured to utilize the abundance of unstructured knowledge that is created in many fields such as in the medical field. These diagnosis systems may be configured to structure the unstructured knowledge by, for example, tagging entities such as findings and disorders within documents of the unstructured corpus to facilitate retrieval of data of the corpus.

SUMMARY

According to embodiments of the present disclosure, a phrase may be received that includes a plurality of tokens in a natural language format. A plurality of levels relating to dependencies between tokens of the plurality of tokens within the phrase is determined. The plurality of tokens includes words of the phrase. A matrix structure is generated for the phrase. The matrix structure utilizes a plurality of rows and a plurality of columns to store data of the phrase. The plurality of rows and the plurality of columns each indicate one of an order of tokens of the plurality of tokens or levels of the plurality of levels.

Other aspects of the disclosure relate to a computer-implemented method for organizing tokens of a phrase of a corpus of phrases, where the tokens include words of the phrase. The method further includes receiving a phrase that includes a plurality of tokens in a natural language format. The method further includes generating a parse tree data structure for the phrase, the parse tree data structure includes a plurality of levels relating to dependencies within the phrase. The method further includes generating, for the phrase using the parse tree data structure, a matrix structure that utilizes a plurality of rows and a plurality of columns to store data of the phrase. The plurality of rows and the plurality of columns each indicate one of an order of tokens of the plurality of tokens or levels of the plurality of levels.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
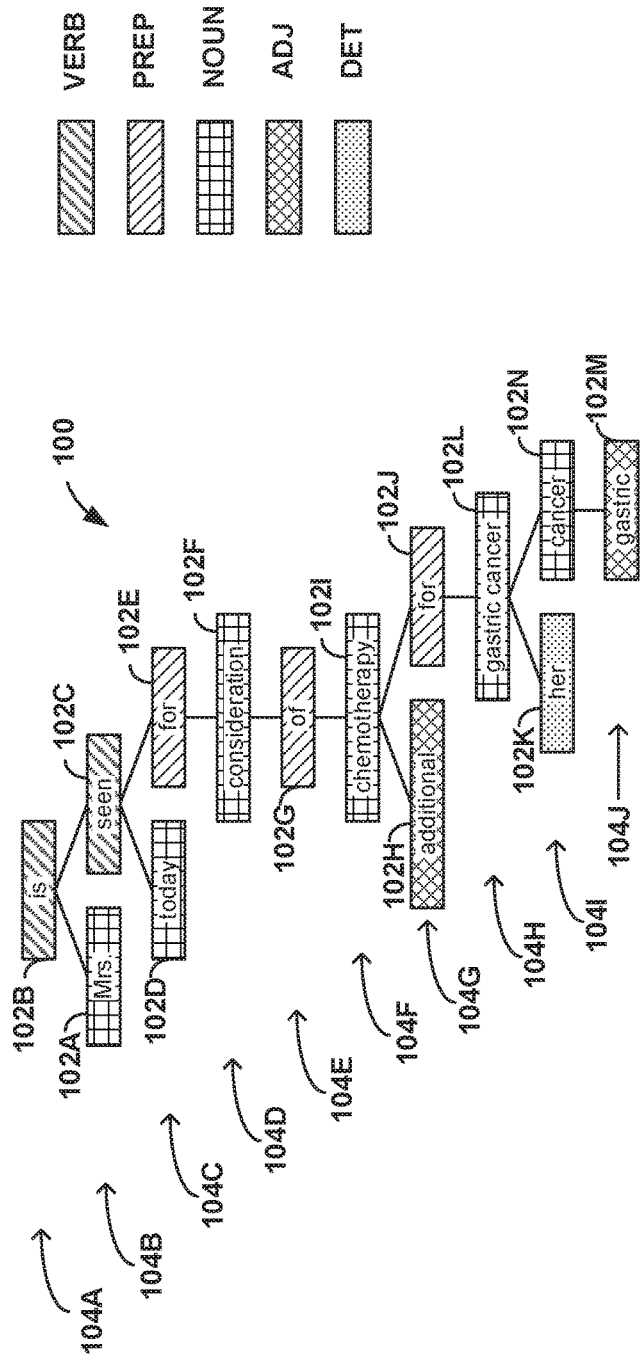
FIGS. 1A and 1B depict an example parse tree and an example matrix structure of a first example phrase.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing of phrases, more particular aspects relate to creating a matrix structure to store data of and otherwise represent a natural language phrase. While the present disclosure is not necessarily limited to such applications, various aspects of the disclosure may be appreciated through a discussion of various examples using this context.

Aspects of this disclosure relate to computing systems that are configured to receive unstructured natural language data and therein structure and analyze the natural language data. For example, such a computing system may be used to structure a corpus of (previously unstructured) natural language phrases to improve the ability of the diagnosis system in accurately interpreting natural language data. Though a diagnosis system is predominantly used herein for purposes of explanation, it is to be understood that other natural language processing (NLP) systems may be used in different examples, such as a more general question-answer system.

As used herein, a corpus as analyzed by a computing system (e.g., such as for use by a diagnosis system) may include a relatively large collection of data (e.g., tens or hundreds of terabytes of data). In some examples, most or all of the corpus may have been (e.g., when entered into the corpus) or may still include unstructured natural language data. Natural language data may be unstructured when the data includes substantially only the text and no metadata such as grammatical data, syntax data, definitional data, inter-relational data (e.g., data on relationships between words) or the like. As used herein, natural language phrases or natural language data may include sentences, phrases, notes, documents, books, or the like that were initially entered into the computing system or are otherwise stored in the computing system in their natural language format. In some examples, unstructured natural language data may initially be entered or analyzed as an image (e.g., a photocopy of hand-written notes). In other examples, unstructured natural language may initially be entered or analyzed as raw text data (e.g., entered as character data, where each letter or number or symbol or space or the like is uniquely identified).

Diagnosis systems may include systems that use such unstructured natural language data (or that convert and therein use the unstructured natural language data) to generate or otherwise critique a medical diagnosis. For example, a diagnosis system may generate or evaluate a medical diagnosis for a patient in response to the diagnosis system receiving medical data of the patient. The diagnosis system may generate or evaluate a diagnosis using a corpus of medical data that is related to a condition of the patient. In some examples, an accuracy and/or reliability of the diagnosis system may be improved by increasing an amount of data in the corpus. Additionally, or alternatively, an accuracy and/or reliability of the diagnosis system may be improved by increasing a fidelity of the data of the corpus. For example, where a diagnosis system may have an improved ability of determining an accurate linguistic meaning of data, the diagnosis system may have an increased likelihood of applying the data to generate an accurate diagnosis.

In some examples, one area in which a computing system may become more accurate is in determining "triggers" that relate to respective "spans." As used herein, a trigger may be a token that alters a subset of tokens of the phrase, the subset of tokens referred to as a span. Further, a token as used herein may be a word or an annotation or code or shorthand or the like. For example, a trigger token may be a "hypothetical" token (e.g., a token that indicates a hypothetical) such as "if" that indicates that the respective span may be a hypothetical, and therein not to be interpreted as a fact. Another example of a trigger token may include a negative determinant such as "not" that indicates that the respective span may be negated. Other types of trigger tokens (and other types of actions that the triggers cause to their respective spans) that are consistent with the disclosure are also possible.

Toward this end, in some examples a computing system may generate a parse tree data structure for phrases of the corpus. The parse tree may include each token of the phrase linked to at least one other token of the phrase in a manner the indicates relationships between the tokens. Further, the parse tree may include tokens at varying levels, where the "higher" the level of a token the more that token impacts the meaning (e.g., by defining or directing or otherwise providing syntactical context to the meaning) of other tokens of the phrase. For example, if a first token of a phrase impacts all other tokens of a phrase, that first token may be on the "highest" level of the parse tree. In such an example, a trigger token would be at a higher level than the span which the trigger token impacted, and much or all of the span might be on a single level.

The computing system may generate the parse tree using one or more logical parsing techniques. For a general outline of a logical parsing technique, a computing system may utilize a parser to generate a first parse representation of natural language content by executing NLP on the content. Once the first parse representation is generated, the system may then execute a logical parse of this first parse representation. The system may execute this logical parse by identifying latent logical operators within the first parse that are indicative of logical relationships between tokens or elements of the natural language content. Logical operators may include (or may otherwise be similar to) triggers as used above. For example, logical operators may include phrases such as "not," "one of the following," "any one of," "at least one of," or logical operators may include complex logical operator terms such as "either/or" and "neither/nor," or logical operators may include relative clauses (e.g., in the sentence "It was the patient who was admitted," the clause "who was admitted" is a relative clause of the patient), or logical operators may include modifiers such as "that," "whom," or "which," or the like. The computing system may then continue by executing a reasoning operation on the logical parse to generate a knowledge output indicative of knowledge associated with one or more of the logical relationships between elements of the natural language content. In this way a computing system may generate a parse tree, other parsing techniques may be used instead of or in conjunction with such techniques.

In some examples, the parse tree may be graphically created and/or graphically stored. In such representations, the token of the phrase that is at the highest level of the phrase may be depicted as at a pinnacle of the parse tree, with tokens at lower levels being depicted as at visually lower locations. In such examples, a user may review the graphical representations (e.g., as displayed in FIGS. 1A and 2A) of parse trees to verify that the computing system is accurately determining relationships and levels of tokens of the phrase. However, given the nature of how the parse tree are depicted, it may be relatively difficult for a human to visually inspect the parse trees and determine the meaning of the sentence, and therein confirm or deny whether the parse tree as generated is accurate or otherwise optimized.

Further, the graphical representation may not be in a format that is readily usable by a computing system, such that the computing system may store the phrase in a first format for its own use and translate the phrase into a second format of the graphical representation for the use of the user. As would be understood by one of ordinary skill in the art, data translations may increase the possibility of a loss of data fidelity. Therefore, configuring a computing system to store and/or execute operations of the analyzed phrase in a first format and present the phrase to a user in a second format may reduce the data fidelity of the computing systems analyzing natural language phrases for, e.g., a diagnosis system or the like.

Aspects of this disclosure are related to determining matrix structures for phrases of a corpus that represent the phrase in a format that may be presented to a user and utilized (e.g., stored, searched, and mathematically or logically operated on) by a computing system. The matrix structure may include a plurality of rows and a plurality of columns that intersect to define a plurality of cells. One of either the rows or the columns may indicate an order of the tokens within the phrase. For example, the columns of the matrix structure may indicate the order of the tokens (e.g., an original order of the tokens with the natural language phrase), with a cell of the first column including the first token of the phrase, and a cell of the second column including the second token of the phrase, etc. Further, the other of the rows or columns of the matrix structure may indicate a "level" of each token of the phrase. For example, a first row of the matrix structure may indicate the highest level of the phrase, while a second row of the matrix structure may indicate the second highest level of the phrase, etc. Further, the cells may indicate grammatical data or syntactical data or the like of each token. In this way, the tokens of the phrase within the matrix structure may be placed in rows and columns to indicate an order and level of respective tokens within the phrase in a manner which may be relatively easy for a human to understand, verify, correct, or otherwise modify.

Further, the computing system may use the same matrix structure to analyze data, as the computing system may search within or perform logical operations on the matrix structure. The computing system may identify trigger tokens, cut out spans, search within spans, compare for similar structures, or the like. For example, the computing system may execute "clipping" operations, where a span of a trigger is identified and removed or otherwise interpreted appropriately relative to the trigger. Further, being as numbered rows of a matrix structure may indicate levels, a computing system may utilize mathematical operations or the like to confirm relationships between words (e.g., determining that a first token is an immediate child of another token by mathematically comparing their rows, which are only a single integer apart). As such, configuring a computing system to convert natural language content such as phrases into matrix structures as described herein that may be readily manipulated and operated on by the computing system as well as understood and/or corrected by a human all within a single format may improve an ability of the computing system to store and analyze data while maintaining data fidelity.

As described above, aspects of this disclosure may operate in a backend portion of the medical treatment recommendation system where NLP of medical texts is performed. In the backend system, the medical texts may be analyzed using several NLP models including one or more models implementing one or more aspects of this disclosure. The result of such analysis may be the matrix structures described herein that may be utilized by a medical diagnosis system or medical treatment recommendation cognitive system both with regard to machine learning and with regard to actual application to specific patients for providing specific patient medical treatment recommendations.

FIG. 1A depicts parse tree 100 with a plurality of tokens 102A-102N (collectively, "tokens 102") connected together and spaced across a plurality of levels 104A-104J (collectively, "levels 104"). As used herein, tokens 102 may refer to words or symbols or notations or the like. In some examples, each of tokens 102 may have a distinct and unique meaning. Further, as discussed herein, levels 104 of parse tree 100 may indicate the tokens 102 that are impacted, where a first token 102 on a first level 104 may impact the meaning of tokens 102 at a relatively lower level 104 (so long as the respective lower tokens 102 are directly connected rather than connected to the first token 102 through a second token 102 that is at least as high as or higher than the first token 102).

Parse tree 100 as depicted relates to the phrase "Mrs. [name-redacted] is seen today for consideration of additional chemotherapy for her gastric cancer." A computing system (e.g., similar to computing system 200 of FIG. 3) may generate parse tree 100. The computing system may generate parse tree 100 using NLP techniques to identify syntax and interrelationships as shown according to parsing techniques such as described herein. The specific arrangement and construction of parse tree 100 for the sentences is depicted for purposes of illustration only, as in other examples other systems may place tokens 102 on different levels 104 for different reasons.

In some examples, as depicted, parse tree 100 may be generated such that respective boxes that include tokens 102 are displayed differently (e.g., colored or shaded or otherwise styled differently) to indicate different metadata of tokens 102. For example, boxes of tokens 102 may be displayed differently to indicate what part-of-speech respective tokens 102 are. Additionally, or alternatively, boxes of tokens 102 may be displayed differently if a respective token 102 is a trigger. Other options within tokens 102 are also possible.

In some examples it may be difficult for a person to quickly and clearly identify whether or not parse tree 100 is generated accurately to depict all relationships of the sentence. For example, a person may be used to reading words in a directly horizontal fashion (e.g., left-to-right, or right-to-left), such that it may be complex to quickly grasp the meaning of the sentence and to identify if the meaning is accurately reflected in parse tree 100. Aspects of this disclosure are directed toward additionally or alternatively generating a matrix structure to represent the sentence.

Figure 1B:
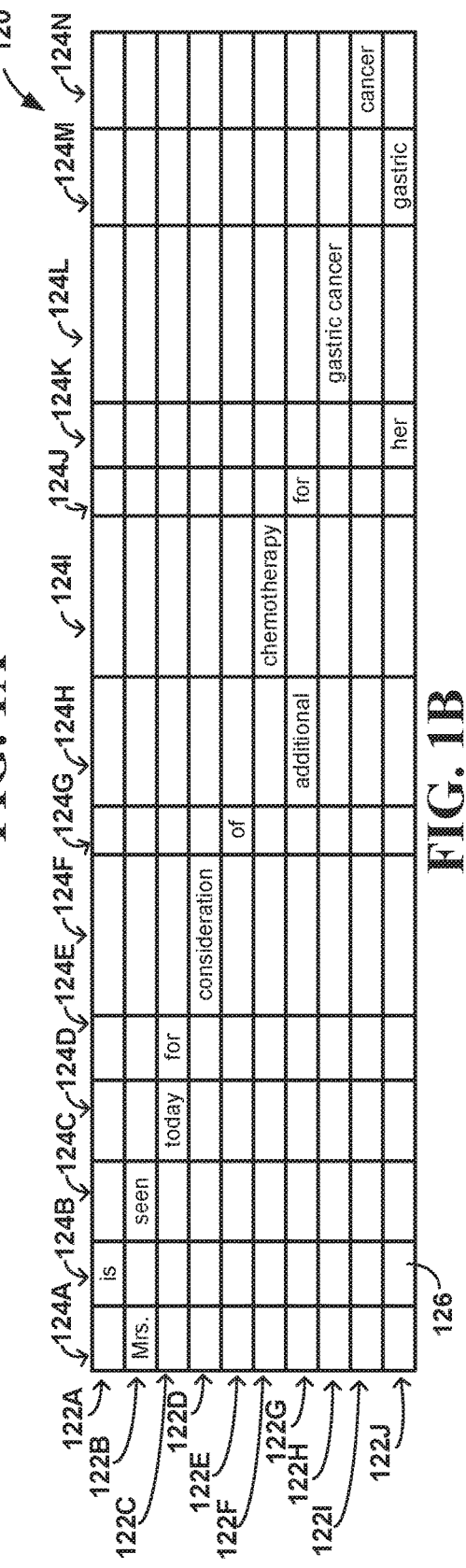

For example, FIG. 1B depicts matrix structure 120 with a plurality of rows 122A-122J (collectively, "rows 122") and a plurality of columns 124A-124N (collectively, "columns 124") that intersect to define a plurality of cells 126. Cells 126 are not individually labelled for purposes of clarity. Additionally, reference to cell 126 herein can refer to any individual cell 126 and does not necessarily refer to the specific cell 126 labelled in FIG. 1B. Matrix structure 120 relates to the same sentence as parse tree 100, such that matrix structure 120 uses the same tokens 102 as parse tree 100.

As depicted, each token 102 may be assigned to (or otherwise stored within) a unique column 124. Put differently, there may be only one token 102 in a respective column 124. In some examples, tokens 102 may be arranged in columns 124 such that tokens 102 are in a respective column 124 that corresponds with the respective location of the respective token 102 in the original sentence. For example, token 102A that was the first token in the sentence may be in a left-most column 124A, while token 102B that was the second token in the sentence may be in column 124B immediately to the right of the left-most column 124A, etc. As a result of tokens 102 being arranged in columns 124 in this manner, matrix structure 120 may improve a relative readability of matrix structure 120 (e.g., in relation to a respective parse tree 100).

Matrix structure 120 may be generated such that tokens 102 are in cells 126 of rows 122 that indicate a respective level 104 of tokens 102. For example, matrix structure 120 may be generated such that token 102B that is on highest level 104A of parse tree 100 is within the relative highest or first row 122A, while tokens 102A, 102C that are on second highest level 104B of parse tree 100 are on second highest row 122B, etc. Generating matrix structure 120 such that rows 122 of matrix structure indicate levels 104 of the sentence may enable a user viewing matrix structure 120 to quickly identify and/or evaluate interdependencies of tokens 102 within matrix structure 120.

Though for purposes of clarity matrix structure 120 as depicted in FIG. 1B includes only token 102 data (e.g., such that respective cells 126 are either an empty cell or include just the word/token), in some examples cells 126 may include tokens 102 as well as other metadata. In some examples, cells 126 may include a lemma form, a part-of-speech, or a slot name of the respective token 102. For example, for token 102L, cell 126 may include "gastric cancer" for the lemma form of token 102L, "object preposition" (or objprep) for the slot name of token 102L, and/or "noun" for the part-of-speech of token 102L.

In some examples, cell 126 may include information identifying itself within matrix structure 120. For example, cell 126 may further include an "8" indicating that cell 126 is in the $8^{th}$ row 122H of matrix structure 120, or cell 126 may include "12" indicating that cell 126 is in $12^{th}$ column 124L of matrix structure 120. In some examples, cell 126 may further identify a parent token 102, which is a respective token 102 that the immediate token is directly dependent on. In this example, cell 126 may identify this parent token with a "7" and "10" for row 122G and column 124J of token 102J that is a parent of token 102L. In some examples, cell 126 may include information such as token 102L being a right mod with respect to its nearest branching parent token 102I (e.g., indicating that child token 102J branches to a graphical right of its nearest parent token for parsing techniques where a branching direction indicates meaning) of cell 126 with info such as "right."

In some examples, cell 126 may also include information regarding any triggers of the phrase, and/or information regarding the span of the phrase. For example, cells 126 may include information as to whether they are a trigger, and/or whether the cells are part of a span that is affected by a trigger. If cells 126 are part of a trigger or within a span of the trigger, then these cells 126 may include data "trigger."

A computing system may identify that "for consideration" is a trigger relating to a span of "of additional chemotherapy for her gastric cancer" (e.g., such that each of these tokens 102G-102N includes this "trigger" tag"). For example, the computing system may identify that "for consideration" is an "ignore trigger" that indicates that the span is irrelevant to the sentence and can be ignored.

In certain examples, cells 126 of matrix structure 120 may further include data when cells are part of a clipping span. In such examples, a clipping span may include tokens 102 for which a relationship between the tokens 102 and an identified trigger is to be disregarded when the trigger is activated (e.g., the trigger is removed). To provide a single example, in sentences where a hypothetical token (which is identified as a trigger) may impact a non-hypothetical portion of a phrase (which is identified as the clipping), the hypothetical trigger may be hidden while the non-hypothetical clipping remains with no relationship to the hypothetical trigger (as the relationship is clipped with the trigger). Such a clipping span may be identified in respective cells 126 with data "clipping" or the like. In this example, a clipping is identified as "her gastric cancer."

Adding all of this together, and cell 126 at column 124L and row 122H may include data "clipping_trigger_gastric_cancer_objprep_noun_8_12_7_10_right." Note that, in this sentence, the same phrase that was identified as a clipping was also part of the triggering span, such that the relationship between the clipping span may not be severed from the trigger (as the clipping itself will be removed with the trigger). In other examples, different annotations may be used, or similar data may be presented in cells 126 in a different order. For example, matrix structure 120 may not include a "clipping" annotation where cell 126 already includes a "trigger" annotation (e.g., as a result of the relationship described above).

Once generated, a computing system may execute operations on the matrix structure 120. For example, the computing system may cause columns 124 or tokens 102 with a "trigger" annotation to be hidden within a corpus. Additionally, or alternatively, the computing system may cause relationships associated with a trigger to be severed for columns with a "clipping" annotation. In this way, that tokens 102 within those columns 124 may not be accessed, and/or may not be related to the triggers, when the computing systems uses this matrix structure 120 to determine answers or the like.

Figures 2A, 2B:
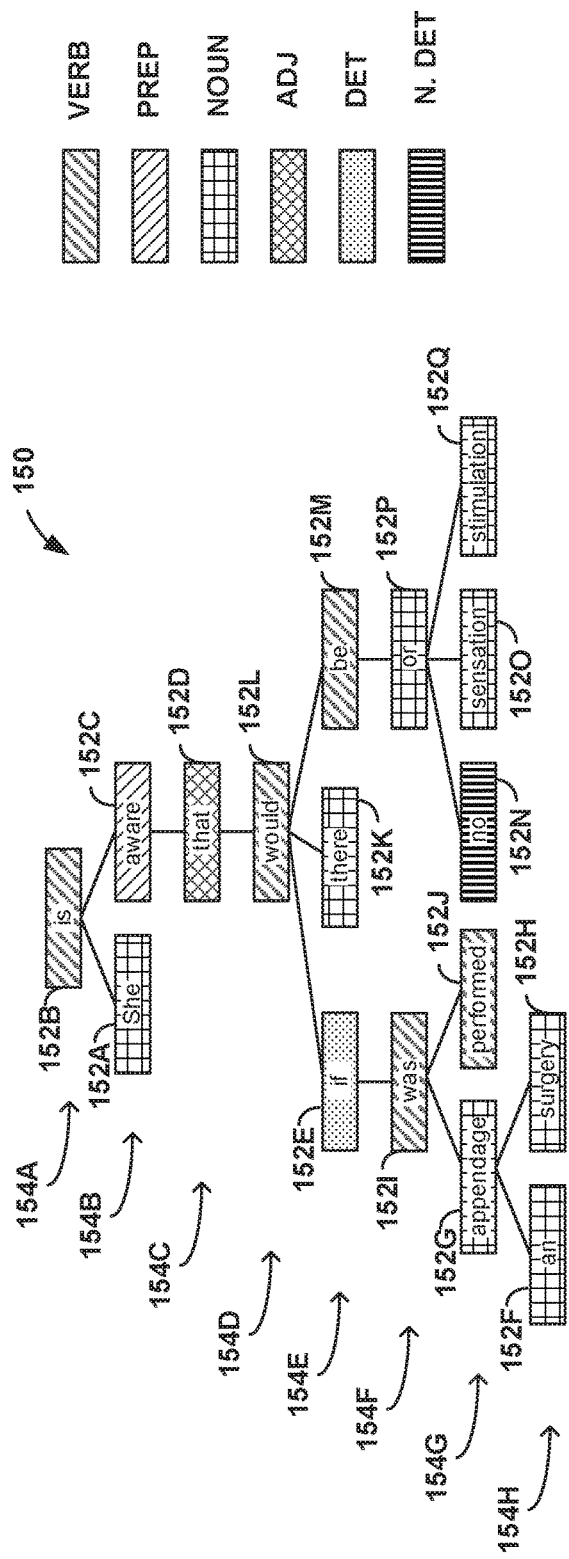
FIGS. 2A and 2B depict an example parse tree and an example matrix structure of a second example phrase.

For another example, FIGS. 2A and 2B depict parse tree 150 and matrix structure 170 similar to parse tree 100 and matrix structure 120 of FIGS. 1A and 1B. Parse tree 150 includes tokens 152A-152Q (collectively, "tokens 152") connected together and spaced across a plurality of levels 154A-154H (collectively, "levels 154"). Tokens 152 may be substantially similar to tokens 102, and levels 154 may be substantially similar to levels 104, with the exception of any differences described herein. Parse tree 150 as depicted relates to the phrase "She is aware that if an appendage surgery was performed there would be no sensation or stimulation." A computing system (e.g., similar to computing system 200 of FIG. 3) may generate parse tree 150. The computing system may generate parse tree 150 using NLP techniques to identify syntax and interrelationships as shown. The specific arrangement and construction of parse tree 150 is depicted for purposes of illustration only, as in other examples other systems may place tokens 152 on different levels 154 for different reasons.

Further, FIG. 2B depicts matrix structure 170 with a plurality of rows 172 and a plurality of columns 174 that intersect to define a plurality of cells 176, none of which are individually labelled for purposes of clarity. Matrix structure 170 relates to the same sentence as parse tree 150, such that matrix structure 170 uses the same tokens 152 as parse tree 150. A computing system may generate matrix structure 170 using similar and/or identical parsing techniques as discussed herein for generating parse trees such as parse tree 150.

A computing system that generates parse tree 150 and matrix structure 170 may identify an ignore trigger of "if" token 152E, and the computing system may also identify a clipping of "was performed" tokens 152I, 152J. As is depicted in parse tree 150 and matrix structure 170, tokens 152I, 152J are immediate children of "if" token 152E, such that there is no relationship between "if" token 152E and other tokens 152 of the phrase. Put differently, as depicted in matrix structure 170, there are no intermediate tokens between "if" token 152E and children of "if" token 152E for this sentence.

In some examples, organizing the phrase in matrix structure 170 may simplify a manner of determining whether or not intermediate tokens 152 exist. For example, a computing system may execute a subtraction operation between row 172 elements of tokens 152 to determine a number of rows 172 (and therein levels 154 or intermediate tokens 152) between a parent token and a child token. For example, a computing system may subtract a difference between a respective row 172 of a selected token 152 and rows 172 of direct children of the selected token 152, where direct children may be tokens 152 that are on a lower row 172 than the selected token 152 within an interceding token 152 that is on at least as high of a respective row 172 as the selected token 152.

Here, as depicted, a difference of 1 between "if" token 152E and a "highest" of direct children (e.g., "was" token 152I) of "if" token 152E indicates that the lower token 152 is an immediate child to the parent token 152 (e.g., with no intervening tokens 152 impacting a meaning). In this way, structuring the phrase in matrix structure 170 like this may improve an ability of a computing system to determine and/or verify relationships and/or connections between tokens 172. Other similar operations are possible when organizing token 152 data in this 2-dimensional array and including row 172 and column 174 data within cells 176 for simple arithmetic.

Figure 3:
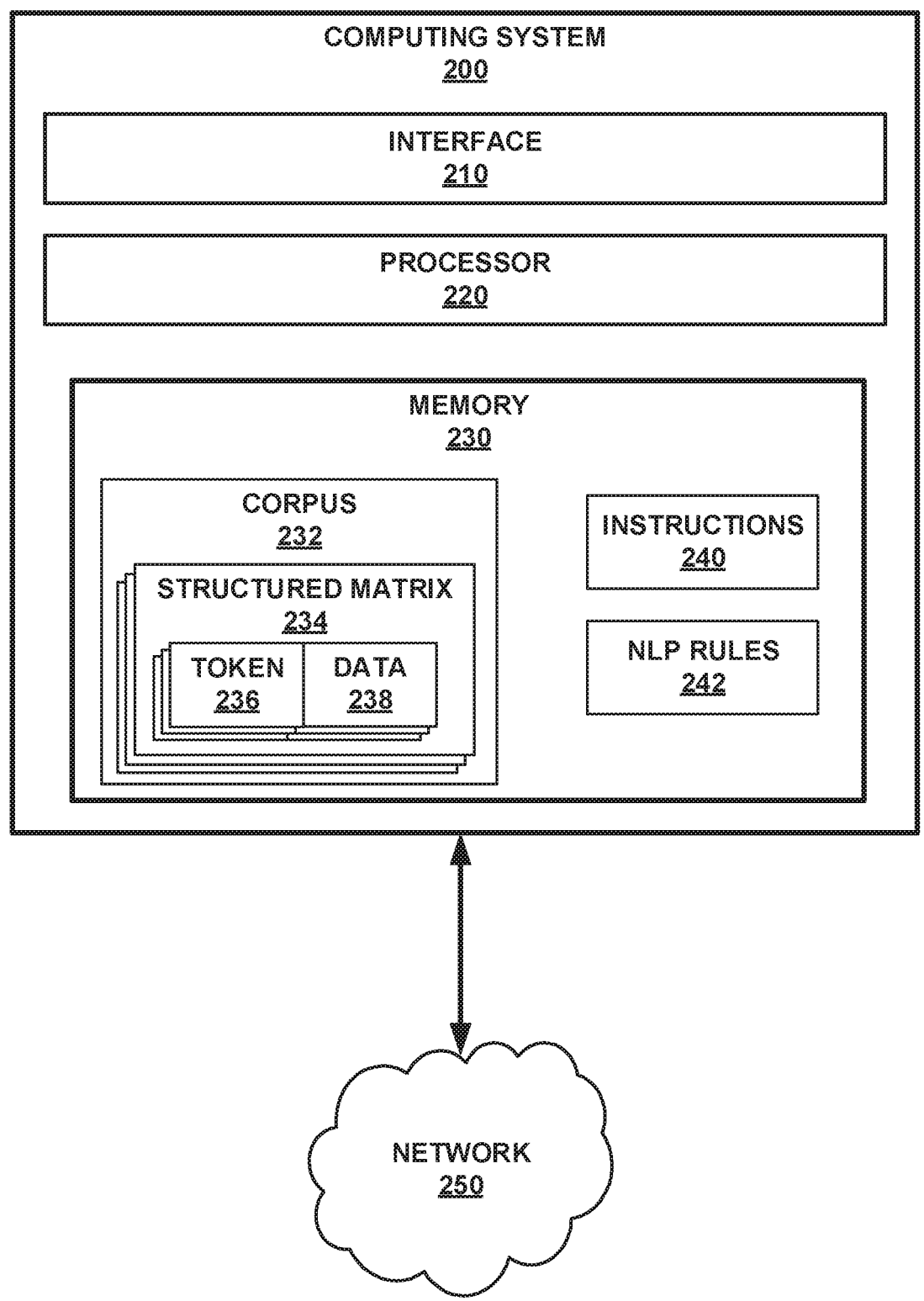
FIG. 3 depicts an example computing system for determining a matrix structure for a natural language phrase.

As described above, a computing system may generate matrix structures 120, 170 as described herein, and therein execute operations on these matrix structures 120, 170 to better organize and structure a corpus. For example, FIG. 3 is a conceptual box diagram of such a computing system 200. While computing system 200 is depicted as a single entity (e.g., within a single housing) for the purposes of illustration, in other example computing system 200 may include two or more discrete physical systems (e.g., within two or more discrete housings). Computing system 200 may include interfaces 210, processor 220, and memory 230. Computing system 200 may include any number or amount of interface 210, processor 220, and/or memory 230.

Computing system 200 may include components that enable computing system 200 to communicate with (e.g., send data to and receive and utilize data transmitted by) devices that are external to computing system 200. For example, computing system 200 may include interface 210 that is configured to enable computing system 200 and components within computing system 200 (e.g., such as processor 220) to communicate with entities external to computing system 200. Specifically, interface 210 may be configured to enable components of computing system 200 to communicate with external databases or other computers uploading new phrases or the like. Interface 210 may include one or more network interface cards, such as Ethernet cards, and/or any other types of interface devices that can send and receive information. Any suitable number of interfaces may be used to perform the described functions according to particular needs.

Computing device 200 may use interface 210 to communicate with other devices over network 250. Network 250 may include one or more private or public computing networks. For example, network 250 may comprise a private network (e.g., a network with a firewall that blocks non-authorized external access). Alternatively, or additionally, network 250 may comprise a public network, such as the Internet. Although illustrated in FIG. 1 as a single entity, in other examples network 250 may comprise a combination of public and/or private networks. For example, computing device 200 may communicate with a database that includes a corpus of unstructured data via a first portion of network 250 that is private (e.g., such that both computing device 200 and the database are secured within one or more firewalls) while computing device 200 communicates with a second computer that is uploading a new set of unstructured data via a second portion of network 250 that is public (e.g., the Internet).

As discussed herein, computing system 200 may be configured to generate matrix structures to represent phrases, and therein execute operations on these structures, such as described above. Computing system 200 may utilize processor 220 to generate matrix structures and execute subsequent operations. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to generate matrix structures and execute subsequent operations.

Processor 220 may generate matrix structures and execute subsequent operations according to instructions 240 stored on memory 230 of computing system 200. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 220 may generate matrix structures and execute subsequent operations according to instructions 240 of one or more applications (e.g., software applications) stored in memory 230 of computing system 200.

In addition to instructions 240, in some examples unstructured data of corpus 232 as described herein or NLP rules 242 for better learning how to generate matrix structures or the like as used by processor 220 to generate matrix structures and execute subsequent operations may be stored within memory 230. For example, memory 230 may include corpus 232. As discussed herein, corpus 232 may include a plurality of natural language phrases that were previously unstructured. Within corpus 232, as depicted, phrases may be stored within respective structure matrices 234. Each structured matrix 234 may include a plurality of tokens 236 with a plurality of data 238. Data 238 may include syntax, column data, row data, trigger data, and/or clipping data as described above. As depicted, tokens 236 and data 238 may be related, e.g., combined together into single cells of a respective structure matrix 234.

Other types of data may also be stored within memory 230 for use by processor 220 in generating matrix structures and executing subsequent operations. For example, memory 230 may include natural language processing (NLP) rules 242 with which computing system 200 may store NLP techniques that it utilizes and updates and reinforces or disregards through machine learning (ML) techniques. In some examples, processor 220 may execute instructions 240 such that modifications or updates or deletions of data 238 of structured matrices 234 from a skilled operator (e.g., a doctor or a NLP trainer of computing system 200) may cause NLP rules 242 to themselves be updated or modified or deleted to reflect such skilled corrections. In some examples, a person may view some or all of NLP rules 242 to reinforce or disregard (e.g., delete or otherwise modify) some rules stored within NLP rules 242.

Figure 4:
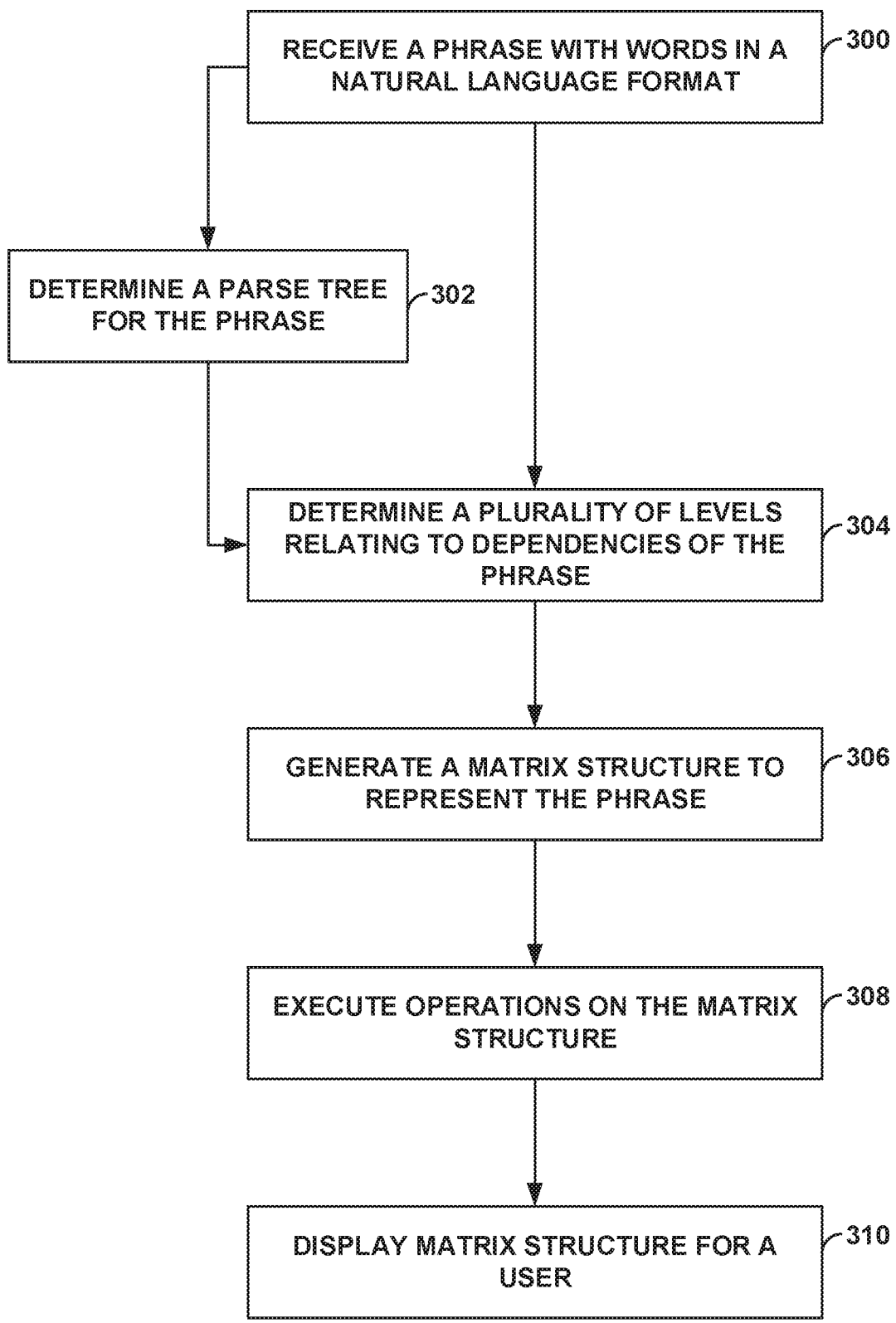
FIG. 4 depicts a flowchart of an example method of determining a matrix structure for a natural language phrase.

Using these components, computing system 200 may determine and/or generate matrix structures and execute subsequent operations as discussed herein. For example, computing system 200 may generate matrix structures and execute subsequent operations according to the flowchart depicted in FIG. 4. The flowchart of FIG. 4 is discussed with relation to FIG. 3 for purposes of illustration, though it is to be understood that other systems may be used to execute the flowchart of FIG. 4 in other examples. Further, in some examples computing system 200 may execute a different method than the flowchart of FIG. 4, or computing system 200 may execute a similar method with more or less steps in a different order, or the like.

Computing system 200 may receive a phrase that includes a plurality of tokens in a natural language format (300). Computing system 200 may receive the phrase in an unstructured format. For example, computing system 200 may have electronic text or a graphical image of text uploaded (e.g., uploaded over network 250 using interface 210).

In some examples, computing system 200 may generating a parse tree data structure for the phrase (302). Computing system 200 may generate a parse tree similar to parse tree 100 of FIG. 1A or parse tree 150 of FIG. 2A. Computing system 200 may generate the parse tree such that the parse tree includes a plurality of levels relating to dependencies within the phrase. In some examples, computing system 200 may generate the parse tree data structure to leverage an infrastructure that is configured to identify tokens and dependencies within the phrase. In other embodiments, the computing system 200 does not generate a parse tree.

Computing system 200 may determine a plurality of levels relating to dependencies within the phrase (304). In some embodiments where computing system 200 generated the parse tree data structure, computing system 200 may identify levels and dependencies as represented within the generated parse tree structure. Otherwise, computing system 200 may utilize NLP techniques to determine dependencies. In some examples, as part of determining the dependencies within the phrase, computing system 200 may further identify triggers, clippings, syntax, and the like of respective tokens.

Computing system 200 generates a matrix structure for the phrase (306). Computing system 200 may generate the matrix structure for the phrase using the parse tree data structure and/or the dependencies within levels as described above. Computing system 200 may generate the matrix structure such that the matrix structure utilizes a plurality of rows and a plurality of columns to store data of and represent the phrase. Further, as described within, one of the plurality of rows or the plurality of columns may indicate an order of tokens of the plurality of tokens, while the other of the plurality of rows or the plurality of columns indicate levels of the plurality of levels. For example, tokens may be within columns according to an order of the tokens within the original phrase, and tokens may be within respective rows to indicate their interdependencies.

Once generated, computing system 200 may execute operations on the matrix structure (308). For example, computing system 200 may execute a trigger operation to hide columns with a "trigger" annotation, or computing operations may execute a clipping operation to hide columns or sever relations between columns that include a "clipping" annotation. Further, in some examples computing system 200 may execute arithmetic operations between column or row numbers to quantify relationships. For example, computing system 200 may determine if tokens are direct children or parents of each other by subtracting rows of each other, and/or computing system 200 may subtract columns between tokens as a factor of determining a likelihood that tokens were related, or other such operations.

In some examples, computing system 200 may generate a display of the matrix structure for a user (310). For example, computing system 200 may output a representation of the matrix structure similar to matrix structure 120 as displayed in FIG. 1B or matrix structure 170 as displayed in FIG. 2B. Computing system 200 may display the matrix structure to a monitor or screen or the like that is coupled to (or integral with) computing system 200. Computing system 200 may generate the matrix structure in such a way that a user may interact with the matrix structure by, e.g., modifying some values or features of the matrix structure. For example, computing system 200 may be configured to enable a user to alter one or more annotations within a cell, or alter a row or column in which a token is stored, or the like.

The examples described above provides mechanisms for ingesting electronic texts, documents, or other portions of textual content and analyzing the textual content to distinguish portions of the text directed to hypotheticals from portions of text directed to actual facts or events that actually occurred. However, though examples described above predominantly relate to medical texts and a cognitive medical treatment diagnosis system, one of ordinary skill in the art would appreciate that aspects of this disclosure may be implemented with regard to many types of text of various domains without departing from the spirit and scope of the present disclosure. Thus, for example, the mechanisms described herein may be implemented with regard to judicial text or any other type of text which may include hypothetical portions and factual portions that may utilize matrix structures within triggers and clippings and other mechanism derived thereof to execute an analytical, cognitive, or other processing of text to generate a result.

In the context of a medical treatment recommendation system embodiment in which the mechanisms of the illustrative embodiments distinguish factual portions of text from hypothetical portions of text, the mechanisms of the illustrative embodiments may ingest various types of medical texts and apply the mechanisms of the illustrative embodiments to these medical texts. These medical texts may include, for example, patient electronic medical records (EMRs) in which medical service providers, e.g., doctors, nurses, hospitals, medical laboratories, pharmacies, medical insurance companies, and the like, may contribute content for inclusion in the EMR. As such, the medical text from each of these sources may contain both facts (actual occurrences, events, or results) and hypotheticals, i.e. plans or other possibilities that did not in actuality occur.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for organizing tokens of a phrase of a corpus of phrases, the method comprising:
    receiving a phrase that includes a plurality of tokens in a natural language format, wherein the plurality of tokens includes words of the phrase;
    determining a plurality of levels relating to dependencies between tokens of the plurality of tokens within the phrase; and
    generating, for the phrase, a matrix structure that utilizes a plurality of rows and a plurality of columns to store data of the phrase, wherein the plurality of rows and the plurality of columns each indicate one of an order of tokens of the plurality of tokens or levels of the plurality of levels.

2. The computer-implemented method of claim 1, wherein the plurality of columns indicates the order of tokens of the plurality of tokens and the plurality of rows indicates the levels of the plurality of levels.

3. The computer-implemented method of claim 1, further comprising determining, using natural language processing (NLP) techniques, that a token of the plurality of tokens is a trigger that changes a meaning of other tokens of the plurality of tokens.

4. The computer-implemented method of claim 3, further comprising determining, using NLP techniques, a span of tokens of the plurality of tokens for which a meaning is changed by the trigger.

5. The computer-implemented method of claim 1, wherein each token of the plurality of tokens is in a unique cell of the matrix structure.

6. The computer-implemented method of claim 1, wherein each column of the matrix structure includes only a single cell of data on the phrase.

7. The computer-implemented method of claim 1, wherein the matrix structure is created such that each column stores a single token of the plurality of tokens.

8. The computer-implemented method of claim 1, wherein the matrix structure indicates syntactical information on each token of the phrase.

9. A computer-implemented method for organizing tokens of a phrase of a corpus of phrases, the method comprising:
    receiving a phrase that includes a plurality of tokens in a natural language format, wherein the plurality of tokens includes words of the phrase;
    generating a parse tree data structure for the phrase, the parse tree data structure includes a plurality of levels relating to dependencies within the phrase; and
    generating, for the phrase using the parse tree data structure, a matrix structure that utilizes a plurality of rows and a plurality of columns to store data of the phrase, wherein the plurality of rows and the plurality of columns each indicate one of an order of tokens of the plurality of tokens or levels of the plurality of levels.

10. A system comprising:
a processor; and
a memory in communication with the processor, the memory containing program instructions that, when executed by the processor, are configured to cause the processor to:
receive a phrase that includes a plurality of tokens in a natural language format, wherein the plurality of tokens includes words of the phrase;
determine a plurality of levels relating to dependencies between tokens of the plurality of tokens within the phrase; and
generate, for the phrase, a matrix structure that utilizes a plurality of rows and a plurality of columns to store data of the phrase, wherein the plurality of rows and the plurality of columns each indicate one of an order of tokens of the plurality of tokens or levels of the plurality of levels.

11. The system of claim 10, wherein the plurality of columns indicates the order of tokens of the plurality of tokens and the plurality of rows indicates the levels of the plurality of levels.

12. The system of claim 10, the memory further comprising instructions that, when executed by the processor, cause the processor to determine, using natural language processing (NLP) techniques, that a token of the plurality of tokens is a trigger that changes a meaning of other tokens of the plurality of tokens.

13. The system of claim 12, the memory further comprising instructions that, when executed by the processor, cause the processor to determine, using NLP techniques, a span of tokens of the plurality of tokens for which a meaning is changed by the trigger.

14. The system of claim 10, wherein each token of the plurality of tokens is in a unique cell of the matrix structure.

15. The system of claim 10, wherein each column of the matrix structure includes only a single cell of data on the phrase.

16. The system of claim 10, wherein the matrix structure is created such that each column stores a single token of the plurality of tokens.

17. The system of claim 10, wherein the matrix structure indicates syntactical information on each token of the phrase.

18. A computer program product, the computer program product comprising a computer readable storage medium having program instructions embodied therewith, the program instructions executable by a computer to cause the computer to:
receive a phrase that includes a plurality of tokens in a natural language format, wherein the plurality of tokens includes words of the phrase;
determine a plurality of levels relating to dependencies between tokens of the plurality of tokens within the phrase; and
generate, for the phrase, a matrix structure that utilizes a plurality of rows and a plurality of columns to store data of the phrase, wherein the plurality of rows and the plurality of columns each indicate one of an order of tokens of the plurality of tokens or levels of the plurality of levels.

19. The computer program product of claim 18, wherein the plurality of columns indicates the order of tokens of the plurality of tokens and the plurality of rows indicates the levels of the plurality of levels.

20. The computer program product of claim 18, the computer readable storage medium further comprising program instructions that, when executed by the computer, cause the computer to determine, using natural language processing (NLP) techniques, that a token of the plurality of tokens is a trigger that changes a meaning of other tokens of the plurality of tokens.

21. The computer program product of claim 20, the computer readable storage medium further comprising program instructions that, when executed by the computer, cause the computer to determine, using NLP techniques, a span of tokens of the plurality of tokens for which a meaning is changed by the trigger.

22. The computer program product of claim 18, wherein each token of the plurality of tokens is in a unique cell of the matrix structure.

23. The computer program product of claim 18, wherein each column of the matrix structure includes only a single cell of data on the phrase.

24. The computer program product of claim 18, wherein the matrix structure is created such that each column stores a single token of the plurality of tokens.

25. The computer program product of claim 18, wherein the matrix structure indicates syntactical information on each token of the phrase.

* * * * *